(No Specimens.)
R. P. PICTET.
PROCESS OF PURIFYING CHLOROFORM.
No. 489,592. Patented Jan. 10, 1893.
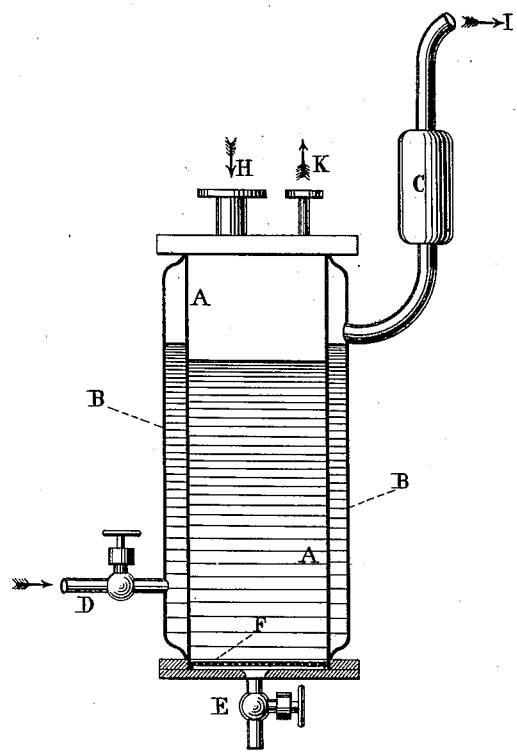
Attest:
Geo. T. Smallwood.
Fern Lewis.
Inventor:
Raoul Pierre Pictet
by Pollok Mauro,
his attorneys.

United States Patent Office.

RAOUL PIERRE PICTET, OF BERLIN, GERMANY.

PROCESS OF PURIFYING CHLOROFORM.

SPECIFICATION forming part of Letters Patent No. 489,592, dated January 10, 1893.

Application filed May 13, 1892. Serial No. 432,922. (No specimens.) Patented in France September 4, 1891, No. 215,911.

*To all whom it may concern:*

Be it known that I, RAOUL PIERRE PICTET, a citizen of Switzerland, residing at Berlin, Germany, have invented certain new and useful Improvements in the Purification of Chloroform, (for which I have received a patent in France, No. 215,911, dated September 4, 1891;) and I do hereby declare the following to be a full, clear, and exact description of the invention, such as will enable others skilled in the art to which it appertains to make and use the same, reference being had to the accompanying drawing, and to letters of reference marked thereon, which form a part of this specification.

Chloroform is a product of great importance in industry and medicine. It is desirable for many reasons to obtain it perfectly pure.

In practice chloroform is made in three ways: First, the reaction of chloride of lime on diluted ethylic alcohol gives by distillation chloroform: second, chloride of lime when allowed to react on acetone produces chloroform: third, chloral hydrate is decomposed by an alkali and chloroform is distilled from the liquor. Now these three processes however carried out, always allow impurities to pass into the liquid chloroform obtained by distillation.

The alcohols employed contain a series of essential oils; various alohols, amylic, methylic &c. These foreign products disturb the chemical reaction and cause a part of these impurities to pass into the condensed vapor with the chloroform. Subsequent washings of the chloroform are unable to separate these bodies which are intimately mixed with the mass. The acetones are as impure as the alcohols and everything said above of chloroform from alcohol is applicable to chloroform from acetone. Chloroform from chloral is more pure than the preceding but the vapor from chloral hydrate separates with difficulty from the vapor of chloroform and it is impossible to preserve the chloroform from traces of this body, the specific action of which is very characteristic. Again the chloroform when obtained is directly mixed with one per cent. of alcohol to give it relative stability. Light, and certain chemical and physical agents tend in a manner at present imperfectly understood to decompose chloroform and to produce in the midst of the liquor secondary products in which hydrochloric acid and free chlorine are found. If these two substances, namely hydro-chloric acid and chlorine are neutralized by the addition of bases such as soda and by the iodides there nevertheless remains in the chloroform thus treated a series of heterogeneous bodies consisting essentially of the series of the tetrachlorides of carbon which remain dissolved in the liquor and no reagent known at present can discover or eliminate them.

The object of the present invention is to purify in a methodical and complete manner chloroform made by one or other of the three above described methods and to give to industry and medicine a chemically pure chloroform.

The invention can be more clearly described in connection with the accompanying drawing (partly in section) which represents an apparatus which may used in carrying out the process hereinafter described.

The process of purification is divided into three distinct steps.

First step. Ordinary chloroform is introduced into a jacketed vessel represented in the drawing. A cylinder of copper or other metal A is surrounded by a jacket B forming a second cylinder hermetically soldered at top and bottom to the cylinder A. Between the two cylinders an annular space of about twenty to forty millimeters is left for the purpose of containing a volatile liquid capable of producing very great cold. Pictet's liquid, chloride of ethyl, methylic ether, ammonia, carbonic acid, protoxide of nitrogen and ethylene may be selected at pleasure as the liquid. The volatile liquid is introduced by the orifice D and the vapors are sucked out by a pump connected to the orifice I. The vapor may also be allowed to escape directly to the air by the orifice I or into a gasometer to prevent it being lost. After having introduced ordinary chloroform into the interior of the cylinder A the selected volatile liquid is allowed to flow in at the orifice D. The vapor which spontaneously forms in the jacket B at once lowers the temperature of the chloroform and allows its temperature to be brought down to $-80°$ to $-82°$ centigrade. The result is that either by means of a pump drawing the vapor from the Pictet's liquid &c. or by allowing to escape directly into the air or into a gasometer under atmospheric pressure the vapors of protoxide of nitrogen or of ethylene the temperature of $-82°$ may be obtained throughout the mass of chloroform. To prevent the volatile liquid from being drawn out an intermediate receiver C is provided on the exit vapor pipe which plays the part of a vapor dome. When the whole mass of chloroform is cooled to from $-80°$ to $-82°$ it is found that the chloroform has become completely milk like and that a multitude of greeny-white flakes are floating in the body and at the surface of the liquid. The low temperature has transformed into solid bodies a number of substances foreign to the chloroform—such as water, hydrated alcohol, and various coloring matters. The chloroform is then filtered by opening the cock E at the bottom of the apparatus above which is placed upon a grating on the upper surface of the bottom a filtering substance such as filtering paper, cotton, fine fabric, &c. The chloroform which runs out at the cock E is absolutely transparent and without color. The chloroform so purified still contains impurities and the second step advances the process of refining.

Second step. The same jacketed vessel A is employed for the second operation after it has been perfectly cleaned and after the filtering substance F, which is charged with the deposits of the first filtering operation, has been changed. The chloroform, already improved by the first step is re-introduced into vessel A and the temperature is reduced this time to below 80° causing the chloroform to freeze and crystallize against the sides of the reservoir. When three quarters of the mass has crystallized the cock E is opened and the liquid non-crystallized part is allowed to run out into a special reservoir. On stopping the pump the temperature rises rapidly and the crystals of chloroform melt. The liquid thus obtained is filtered and is run out of the cock E into the reservoir provided for good products. The chloroform has now arrived at the degree of absolute purity that it is desired to attain, except that in consequence of the somewhat prolonged stay in the metal apparatus and of the filtering substances employed it is possible that traces of foregn matters and dust still remain in suspension. We now come then to the third step.

Third step. The third step consists in distilling the chloroform furnished by the second step at a very low temperature under the influence of a sufficient vacuum. The vapor of the purified chloroform is brought from the special reservoir which contains it into the cold vessel A by the upper opening H. By means of an air pump and of the pipe K a vacuum is made in the vessel A which communicates freely by the opening H with the reservoir containing the chloroform. The vapor is thus condensed against the cold sides of the vessel A and the liquid thus obtained by distillation is absolutely freed from dust and all foreign bodies of whatsoever nature. Care should be taken in this third operation to separate the products of rectification into three parts, the head products, and middle and tail. Eighty per cent. of the total product may be taken as the middle and a medicinal product is thus obtained which is chemically pure.

It is unnecessary to state that the apparatus shown in the drawing may be modified in any suitable manner and that the invention is not limited to the employment of any particular form of apparatus.

Having now particularly described and ascertained the nature of my said invention and in what manner the same is to be performed I declare that what I claim is:—

1. In the purification of chloroform the improvement which consists in cooling ordinary commercial chloroform to about $-80°$ to $-82°$ centigrade, and removing by filtration the solid bodies thereby formed, substantially as described.

2. The process of purifying chloroform, which consists in cooling the chloroform to about $-80°$ to $-82°$ centigrade, filtering, crystallizing the chloroform, and eliminating the non-crystallizable part, substantially as described.

3. The process of purifying ordinary commercial chloroform which consists in solidifying the foreign bodies crystallizable before the temperature reaches $-80°$ and in filtering the cold liquid mass, crystallizing the chloroform itself and eliminating from it the final non-crystallizable part which contains the impurities, and finally distilling the chloroform thus obtained at a very low temperature and collecting the middle products, substantially as described.

In testimony whereof I affix my signature in presence of two witnesses.

RAOUL PIERRE PICTET.

Witnesses:
 ROBT. M. HOOPER,
 G. DE MESTRAL.